(12) United States Patent
Anderson et al.

(10) Patent No.: US 7,993,480 B2
(45) Date of Patent: Aug. 9, 2011

(54) METHOD AND APPARATUS FOR PLACING PLIES ON CURVED SUBSTRATES

(75) Inventors: Robert L. Anderson, Tacoma, WA (US);
Charles M. Richards, Kent, WA (US);
Barry P. VanWest, Bellevue, WA (US);
Jeffrey M. Hansen, Renton, WA (US)

(73) Assignee: The Boeing Company, Chicago, IL (US)

( * ) Notice: Subject to any disclaimer, the term of this patent is extended or adjusted under 35 U.S.C. 154(b) by 827 days.

(21) Appl. No.: 11/941,931

(22) Filed: Nov. 17, 2007

(65) Prior Publication Data

US 2009/0130450 A1     May 21, 2009

(51) Int. Cl.
*B32B 37/10* (2006.01)
*B32B 37/22* (2006.01)
(52) U.S. Cl. ......... 156/285; 156/361; 156/577; 156/185
(58) Field of Classification Search .................. 156/361, 156/540, 574, 577, 360; 264/257–258
See application file for complete search history.

(56) References Cited

U.S. PATENT DOCUMENTS

| | | | | | |
|---|---|---|---|---|---|
| 4,750,965 | A | * | 6/1988 | Pippel et al. | 156/361 |
| 4,954,204 | A | * | 9/1990 | Grimshaw | 156/361 |
| 4,997,510 | A | * | 3/1991 | Shinno et al. | 156/361 |
| 4,997,512 | A | * | 3/1991 | Manusch | 156/486 |
| 5,015,326 | A | * | 5/1991 | Frank | 156/511 |
| 5,176,785 | A | * | 1/1993 | Poyet et al. | 156/574 |
| 5,316,612 | A | * | 5/1994 | Peterson et al. | 156/493 |
| 5,352,306 | A | * | 10/1994 | Grimshaw et al. | 156/64 |
| 5,989,384 | A | * | 11/1999 | Grimshaw et al. | 156/312 |
| 7,004,219 | B2 | * | 2/2006 | Nelson | 156/538 |
| 7,213,629 | B2 | | 5/2007 | Ledet et al. | |
| 7,341,086 | B2 | * | 3/2008 | Nelson et al. | 156/523 |
| 2004/0226651 | A1 | | 11/2004 | Ledet et al. | |
| 2006/0090856 | A1 | * | 5/2006 | Nelson et al. | 156/510 |
| 2006/0260751 | A1 | | 11/2006 | Lauder et al. | |

* cited by examiner

*Primary Examiner* — Sam C Yao
(74) *Attorney, Agent, or Firm* — Tung & Associates

(57) ABSTRACT

A ply placement device uses a ply guide to place plies on a curved substrate surface. The ply guide includes a guide surface and a guide edge that are each curved to match the contour of the substrate so that the ply transitions smoothly from its planar form to a curved form as the ply is placed onto the substrate. The ply guide may be flexible or segmented to allow reconfiguration of the guide surfaces to match various substrate contours.

9 Claims, 7 Drawing Sheets

METHOD AND APPARATUS FOR PLACING PLIES ON CURVED SUBSTRATES

CROSS REFERENCE TO RELATED APPLICATIONS

This application is related to U.S. patent application Ser. No. 11/116,222 filed Apr. 28, 2005 and published Nov. 23, 2006 as Publication No. US 2006/0260751 A1, the entire contents of which are incorporated by reference herein.

TECHNICAL FIELD

This disclosure generally relates to the placement of plies on a substrate, and deals more particularly with a method and apparatus for placing plies on a curved substrate that avoids wrinkling or bridging of the ply.

BACKGROUND

Composite structures may be fabricated by laying up a number of plies comprising woven or knitted fabric pre-impregnated with a carrier, such as a synthetic resin. During hand layup, successive plies are laid up by hand over a tool, and the fabric may be swept by hand in order to reduce possible wrinkling and bridging of the fabric. In some cases, where unacceptable wrinkling or bridging may occur in spite of sweeping, the plies must be lifted and reapplied in order to reduce the wrinkling/bridging. Plies may also be lifted and reapplied to shift the ply to meet ply placement tolerances.

To reduce dependency on hand layup and increase manufacturing flow rate, automated techniques have been devised for controlled placing of the plies during layup which substantially avoids wrinkling and bridging, and thus eliminates the need for rework. For example, automated equipment and methods for placing plies are disclosed in U.S. Pat. Nos. 7,004,219 and 7,213,629, and US Patent Publication number US 2006/0260751 A1, all owned by The Boeing Company, the entire disclosures of which are incorporated by reference herein.

U.S. Pat. No. 7,213,629 referred to above discloses a vacuum assisted ply placement shoe that may be used to place plies on a substantially flat substrate. The shoe includes a pair of straight edge seals respectively engaging the substrate and the ply to form an enclosed area in which a partial vacuum may be drawn. The partial vacuum draws the ply onto the substrate, and in combination with the ply seal, essentially eliminates wrinkling and bridging of the ply. While this placement shoe provides satisfactory results when used to place plies on flat substrates, it may not be effective for use with curved substrates because of the difficulty in maintaining a vacuum between the ply and curved substrate. In addition, wrinkling and/or bridging of the ply may occur because the ply is fed across a straight edge seal onto the curved substrate.

Accordingly, there is a need for a method and apparatus for placing plies on curved substrates that employs vacuum assisted ply placement with high accuracy while eliminating wrinkles or bridging of the ply. Embodiments of the disclosure are intended to satisfy this need.

SUMMARY

In accordance with the disclosed embodiments, a method and apparatus provide for vacuum assisted placement of plies on curved substrates, without wrinkling or bridging of the plies. The apparatus employs a curved guide edge and a guide surface that cooperate to conform the ply to the curvature of the substrate as the ply is fed during the placement process. The shape of the curved guide edge and guide surface may be adjusted to accommodate substrates of different curvatures.

According to one disclosed embodiment, apparatus is provided for placing a ply on a curved substrate, comprising: a substrate seal providing an essentially gas impermeable interface with the substrate; a curved guide edge for producing an essentially gas impermeable ply seal with the ply, the curved guide edge extending laterally relative to the ply and having a curvature related to the curvature of the substrate; and, a vacuum manifold adapted to be coupled with a vacuum source for drawing the ply down onto the substrate. The apparatus may further include a guide surface contiguous with the curved edge of the ply seal for guiding the ply toward the curved edge. Means may be provided for changing the curvature of the curved guide edge, including at least one motor member and a programmed controller for controlling the motor member. The curvature of the curved guide edge generally matches the curvature of the substrate.

According to another disclosed embodiment, apparatus is provided for placing a flexible ply on a curved substrate, comprising: a guide surface over which the ply may be guided onto the substrate as the apparatus and the substrate are moved relative to each other. The guide surface terminates in a guide edge over which the ply passes as the ply is placed on the curved substrate. The guide surface has a curvature generally matching the contour of the ply as the ply passes over the guide edge and is placed onto the substrate. The apparatus further includes a suction device for drawing the ply down over the guide edge and onto the curved substrate. The apparatus may further comprise a substrate seal providing an essentially gas impermeable interface with the substrate, wherein the suction device is coupled between the substrate seal and the guide edge to reduce air pressure beneath the ply. The guide surface may comprise a flexible material or a plurality of individually adjustable, rigid segments having a shape that may be reconfigured to match a particular substrate curvature.

According to a disclosed method embodiment, a ply may be placed on a curve substrate by the steps comprising: feeding the ply over a curved edge of a guide surface onto the substrate; and, adjusting the inclination of the guide surface until the curvature of the curved edge generally matches the curvature of the curved substrate. The method may further include drawing the ply down onto the curved substrate by reducing the ambient air pressure between the ply and the curved substrate.

According to still another method embodiment, a ply is placed on a curved substrate by the steps comprising: moving a vacuum assisted ply placement device over the curved substrate; adjusting the curvature of a curved guide edge on the device to generally conform to the curvature of the substrate; and, feeding the ply over the curved guide edge onto the curved substrate. The method may also include determining the curvature of the curved substrate. The curvature of the curved guide edge may be adjusted by altering the inclination of the device relative to the curved substrate. The curvature of the curved guide seal may also be adjusted by either displacing individual portions of the curved guide edge or by deforming portions of the curved guide edge.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
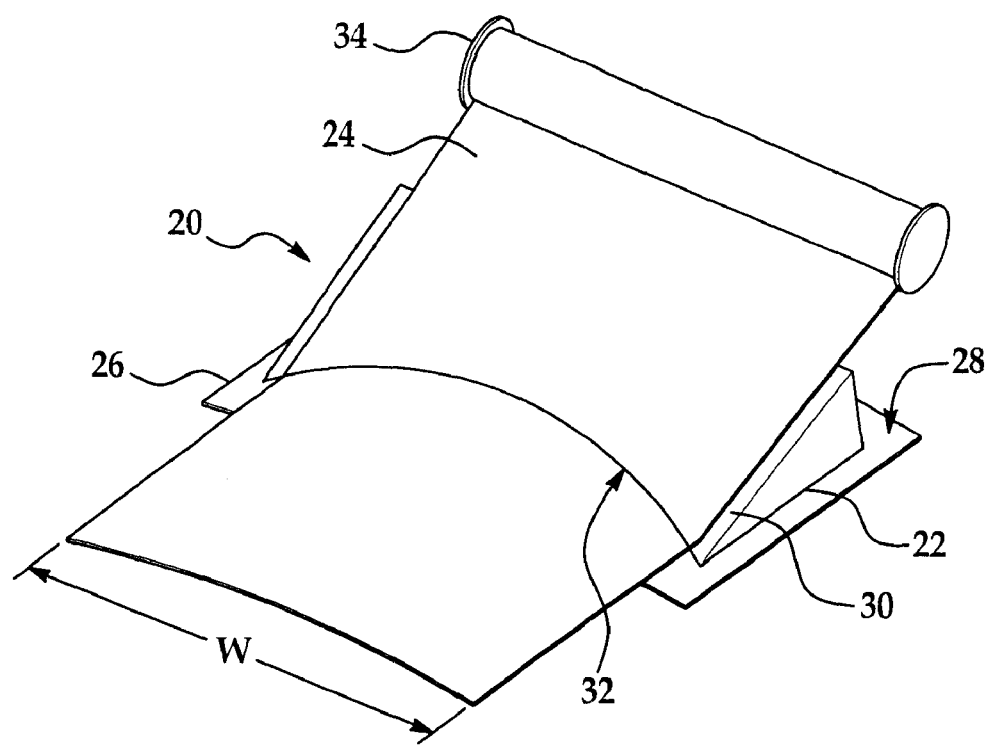
FIG. 1 is a perspective view illustrating the placement of a ply on a curved substrate, in accordance with an embodiment of the disclosure.
Figure 2:
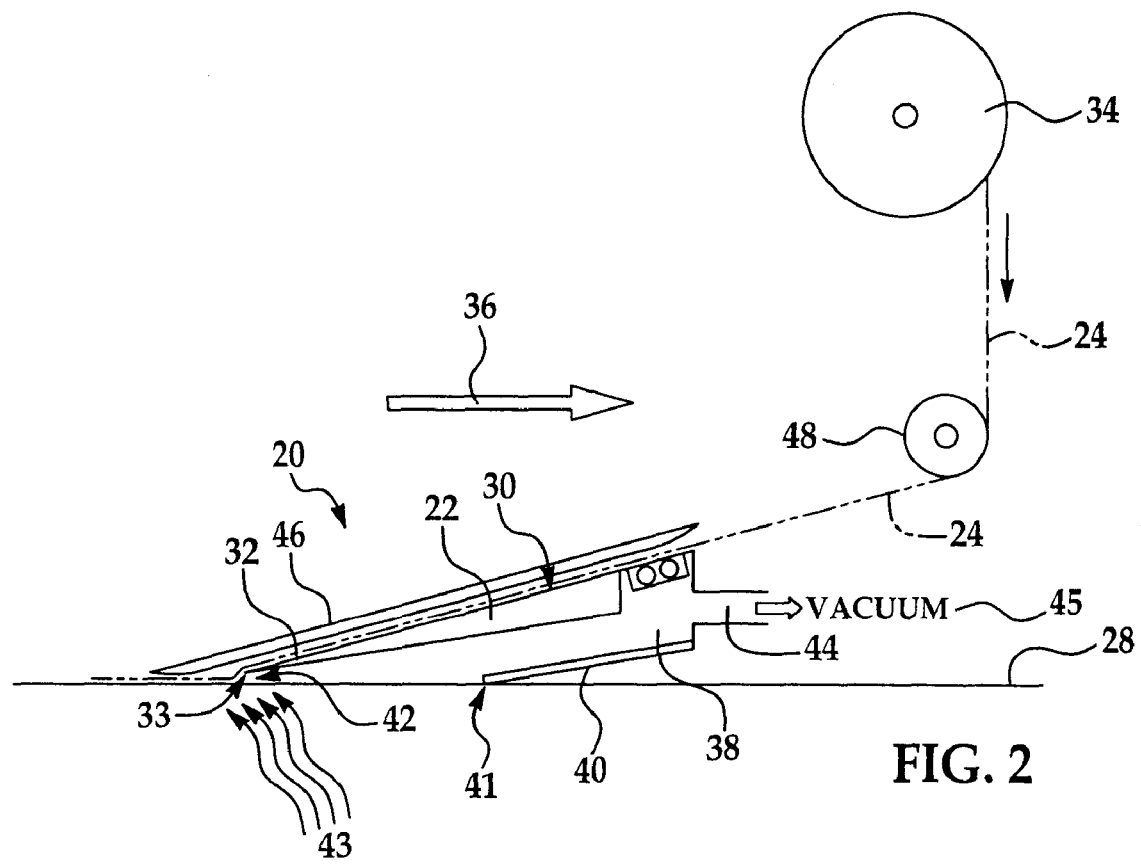
FIG. 2 is a longitudinal sectional view illustrating a device for placing a ply on a curved substrate, in accordance with an alternate embodiment.

Referring first to FIGS. 1 and 2, a ply placement device 20 is used to place a ply 24 on a substrate 26. As will be described later, the ply 24 may be drawn from a roll 34 of ply material which is carried along with the ply placement device 20. In the illustrated example, the ply 24 may comprise a woven or knitted material 24 which may or may not be preimpregnated with a binder such as a synthetic resin. However, the term "ply" as used herein is intended to include numerous forms of flexible, sheet material which may be, without limitation, woven, knitted, pre-preg or solid. The ply 24 may have a width "W" which may be equal to, greater than or less than the width of the substrate 26. The ply 24 may be placed on the upper surface 28 of the substrate 26 which possesses a curvature in the direction of width w.

The device 20 broadly includes a ply guide 22, a substrate seal 40 and a vacuum manifold 38. The ply guide 22 guides the ply 24 onto the substrate surface 28 and is spaced slightly above the substrate surface 28 to form a gap 42. The ply guide 22 includes a curved guide edge 32 that engages the bottom face of the ply 24 and forms a substantially gas impermeable ply seal 33 (FIG. 2) between the ply 24 and the substrate surface 28. Similarly, the substrate seal 40 creates a substantially gas impermeable seal 41 or interface between the substrate surface 28 and the vacuum manifold 38. The vacuum manifold 38 is connected by a coupling 44 to a vacuum source 45 which functions to reduce the air pressure between the ply 24 and the substrate surface 28 in the area of the gap 42. The reduced air pressure near the gap 42 produces a suction force that draws the ply 24 down over the guide edge 32 onto the substrate surface 28 as the device 20 moves over the substrate surface 28. It should be noted here that although the device 20 is depicted as being moveable over the substrate 26 in the direction of the arrow 36 in FIG. 2, it may also be possible to hold the device 20 stationary while the substrate 26 is moved relative to the device 20.

Depending upon the construction of the ply 24, it may be necessary or desirable to apply a backing on the top of the ply 24 which is gas impermeable so that air is not drawn through the ply 24 in the area of the gap 42, thus maintaining the requisite suction force. The ply 24 may be drawn from the feed roll 34 and trained around guide roller 48 before being fed onto the ply guide 22. Depending upon the application, a pressure foot 46 may be needed to press the ply 24 against the curved guide edge 32 and/or the substrate surface 28. The device 20 may include various other features not shown in the drawings. For example, the device 20 may include a ply cutoff device (not shown), a ply heater (not shown), edge seal devices (not shown) and various sensors (not shown) for sensing physical parameters, such as the location of ply edges, the current location of the device 20 and the curvature of the substrate surface 28. Further details of these additional features may be found in U.S. Pat. No. 7,213,629 previously mentioned.

Figure 3:
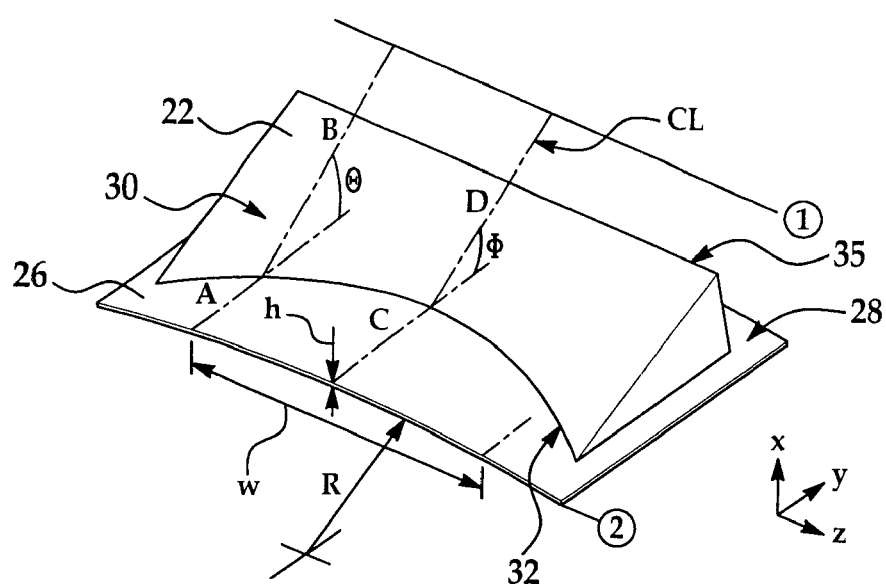
FIG. 3 is a view similar to FIG. 1, the ply having been removed to illustrate certain geometric relationships.

Referring now also to FIG. 3, the ply guide 22 is generally wedge shaped in cross section and includes a ply guide surface 30 for guiding the ply 24 toward the curved guide edge 32. The guide surface 30 is curved in two directions and is contiguous with the curved guide edge 32. The curvature of the guide edge 32 is defined by the intersection of the guide surface 30 and the substrate surface 28. Thus, the guide surface 30 and guide edge 32 each have curvatures that are shaped to match the curvature of the substrate surface 28 and the natural contour of the ply 24 as the ply 24 transitions from being planar to the shape of the curved substrate surface 28. Accordingly, because the curvatures of the guide surface 30 and guide edge 32 are geometrically related to the curvature of the substrate surface 28, wrinkles and bridging of the ply 24 do not occur as the ply 24 transitions from its planar geometry onto the curved substrate surface 28.

The shape of the guide surface 30 and guide edge 32 may be calculated using two relationships. First, the distance on the ply 24 from line "1" to line "2" shown in FIG. 3 is constant along any path "A" and "B" on the ply 24 that is any constant distance from the centerline designated as line "D" on the guide surface 30 and line "C" on substrate surface 28. Secondly, the guide edge 32 is substantially identical to the intersection curve of the guide surface 30 and the substrate surface 28. For a given substrate surface 28 radius "R", ply width W and approach angle "$\phi$", guide surface 30 and guide edge 32 possess a unique shape. Changing the angle $\phi$ while maintaining the substrate radius R changes the unique shapes of the guide surface 30 and guide edge 32 in order to meet the requirement for a constant A and B summed length anywhere on guide surface 30. Likewise, changing the substrate radius R while maintaining the angle $\phi$ constant also changes the shape of the guide surface 30 and guide edge 32.

Equations (1)-(8) set out below may be used to calculate the shape of the guide surface 30 and the curvature of the guide edge 32.

$$A+B=C+D \tag{1}$$

$$A+B \cos \theta = C+D \cos \phi \tag{2}$$

$$B \sin \theta = D \sin \phi + h \tag{3}$$

$$h = R - \tfrac{1}{2}\sqrt{4R^2 - w^2} \tag{4}$$

Where, line 1 is a straight line in the z direction anywhere on ply 24 above the ply guide 22, line 2 is a line in the yz plane anywhere on substrate surface 28, on the other side of ply guide 22 to line 1, A is the distance from line 2 to the curved guide edge 32 in the xy plane, B is the distance from line 1 to the curved guide edge 32 in the xy plane, C is the distance from line 2 to the curved guide edge 32 at centerline of the ply guide 22 in the xy plane, D is the distance from line 1 to the curved guide edge 32 of the centerline of the ply guide 22 in the xy plane, R is the radius of substrate surface 28 in the yz plane in the vicinity of curved guide edge 32, η is the angle between guide surface 30 and substrate surface 28 in the xy plane, Φ is the angle between guide surface 30 and substrate surface 28 at centerline of the ply guide 22 in the xy plane, w/2 is the width of arc on line 2 between line A and line C centerline, and h is the height of arc on line 2 between line A and line C centerline.

Using selected values for C, D, R, φ, and w, the unknown values A, B, a and θ may be calculated using the following equations:

$$\tan(\theta/2) = (1 - \cos\theta)/\sin\theta \quad (5)$$

$$\theta = 2\tan^{-1}[D(1-\cos\phi)/(D\sin\phi + h)] \quad (6)$$

$$B = (D\sin\phi + h)/\sin\theta \quad (7)$$

$$A = C + D - B \quad (8)$$

Lines 1 and 2 represent lines on the ply 24 that extend perpendicular to the centerline "CL" of the ply guide 22 and whose positions may be arbitrarily selected such that line 1 lies on the ply 24 in the area where the ply 24 is planar before reaching the ply guide 22, and line 2 lies on the ply 24 after the ply 24 has been placed on the substrate surface 28. At any perpendicular distance on the ply 24 from the ply guide centerline CL, distance A comprises the distance from line 2 to the guide edge 32, and distance B comprises the distance from line 1 to the curved guide edge 32, and Φ comprises the angle or slope of the guide surface 30. At any point along the centerline CL, distance C comprises the distance from line 2 to the curved guide edge 32 and distance D comprises the distance from line 1 to the curved guide edge 32. R is the radius for the substrate surface 28, and Θ comprises the angle or slope of the guide surface 30 at the centerline CL. w comprises the distance from the line of length A on the substrate surface 28 on line 2 to its mirror image on the other side of the centerline CL. h is the height of the arc created by w. The values of C, D and Φ may be arbitrarily selected, and w is the incrementally increasing width of the arc up to the width of the particular ply 24 that has been selected. The values of A, B, Θ and h may be calculated for each value of w to provide points for generating the curved guide edge 32.

Equations (1)-(4) describe the trigonometric relationships which can be used to develop the solution equations (5)-(8). Equations (5)-(8) allow the calculation of points on the guide edge 32 from which the appropriate curve can be generated. The guide surface 30 may be generated as a ruled surface between the guide edge 32 and a straight line representing the top edge 35 of the guide surface 30. The inclination angle Φ of the substrate surface 28, the curvature of the edge curve 32 and the shape of guide surface 30 may vary, within limits, from nominal calculated values without compromising the functionality of the device, depending upon the particular application. The height of the gap 42 may be selected based on empirical knowledge, vacuum strength, stiffness of ply and other variables. In one satisfactory embodiment, gap 42 may be between approximately ⅛ and ¼ inches.

In one embodiment, the ply guide 22 may comprise a substantially rigid material such as, without limitation, metal or plastic that may be fabricated by a variety of techniques, such as without limitation, NC machining, injection molding, sterolithography or other common fabrication techniques. When assembling the device 20, the ply guide 22 may be positioned such that the centerline CL relative to the substrate surface 28 matches the angle Φ that is calculated using the equations (5)-(8) for a particular application. Also, the guide edge 32 may be positioned a short distance above the substrate surface 28 in order to form the gap 42, which causes the ply 24 to be subjected to the vacuum between the guide edge 32 and the substrate seal 40. In order to enhance adhesion of a composite prepreg ply 24 to the substrate surface 28, heat 43 may be applied to the ply 24 just prior to the ply 24 contacting the substrate surface 28. This heating process increases the tackiness of the ply 24, thereby assuring that the ply 24 adheres to the substrate surface 28 without subsequent bridging or wrinkling.

Figure 4A:
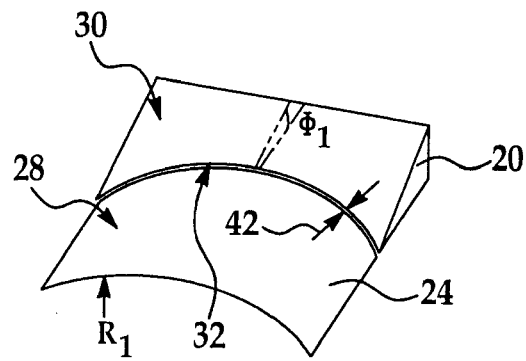
FIGS. 4a-4c are perspective views similar to FIG. 3, illustrating a method for altering the curvature of the guide edge.
Figure 4B:
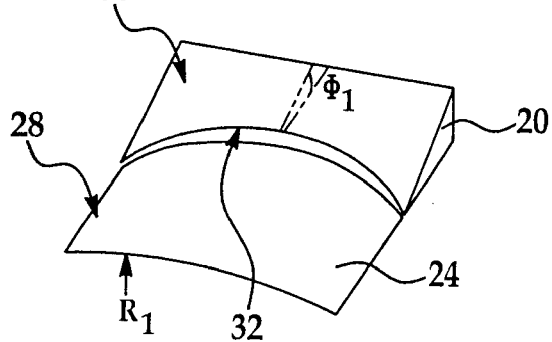
Figure 4C:
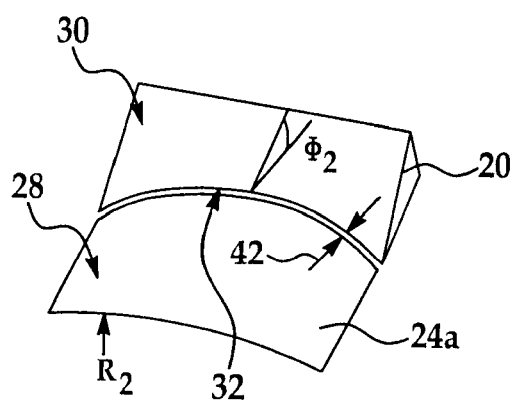

Referring now also to FIGS. 4a-4c which illustrate how pivoting or tilting (changing angle Φ) of the ply guide 22 slightly can adapt the guide edge 32 to more closely conform application of the ply 24 to the contour of the substrate surface 28. For example, as shown in FIG. 4a, the substrate surface 28 has a radius $R_1$ and the guide device 22 is oriented such that the guide surface 30 is inclined along its centerline CL at an angle $\Phi_1$. As shown in FIG. 4b, when the ply guide 22 shown in FIG. 4a is positioned over a substrate surface 28a having a radius $R_2$ that is greater than $R_1$, the guide edge 32 does not conform to the substrate surface 28, resulting in a curvature mismatch or gap 42. In order to reduce the gap 42 and improve conformance of the guide edge 32 to the substrate surface 28, the ply guide 22 is tilted to a different inclination angle $\Phi_2$ where the guide edge 32 conforms more closely to the contour (i.e. radius $R_2$) of the substrate surface 28a. Thus, pivoting or tilting the ply guide 22 to various angles Φ allows improved matching of the fixed guide edge 32 to substrates 24 of various radii, or a single substrate 24 having a cross sectional curvature (radius) that varies along its length, as in the case of a tapered structure, such as the aircraft fuselage 50 shown in FIG. 5, discussed below.

Figure 5:
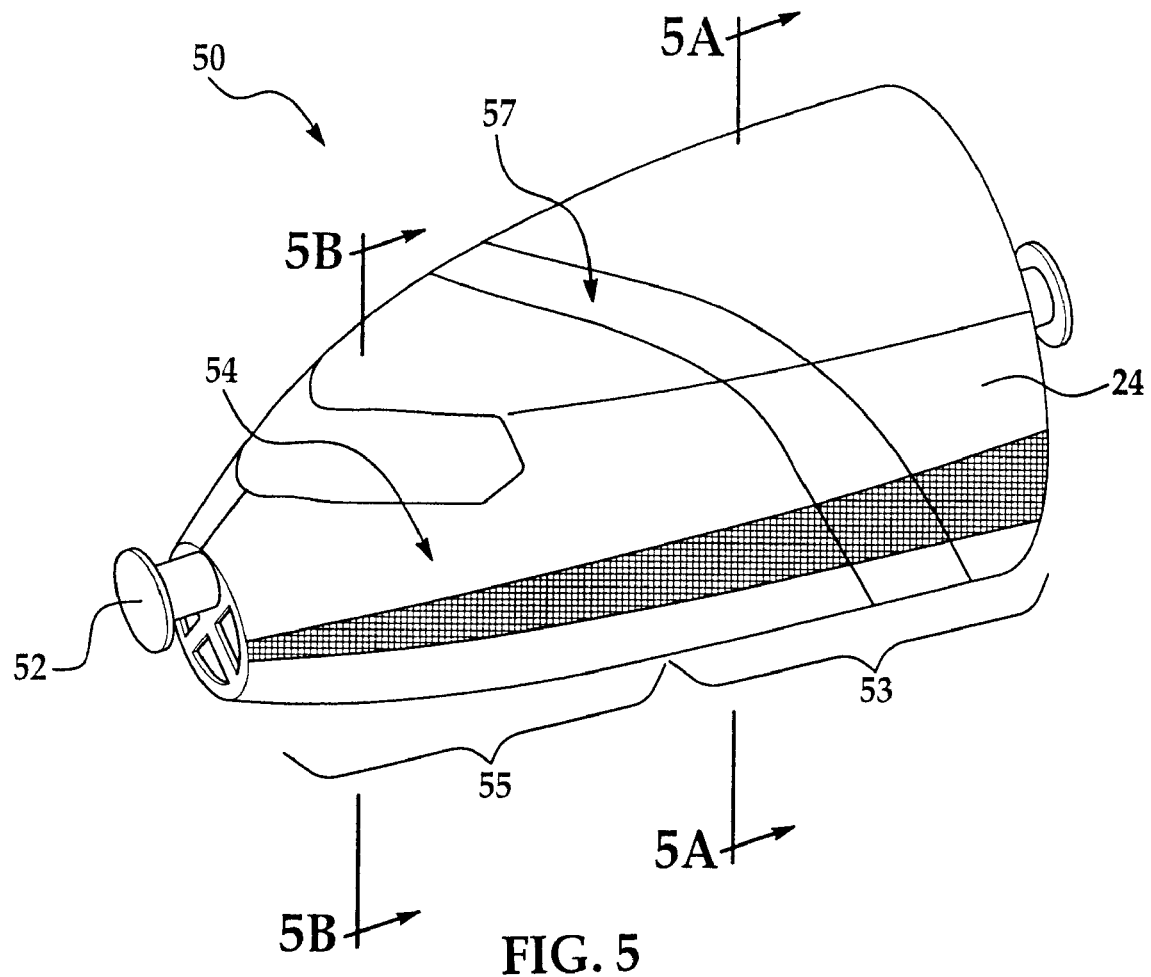
FIG. 5 is an isometric view of a portion of an aircraft fuselage, illustrating placement of a ply that tapers and varies in curvature along its length.
Figure 5A:
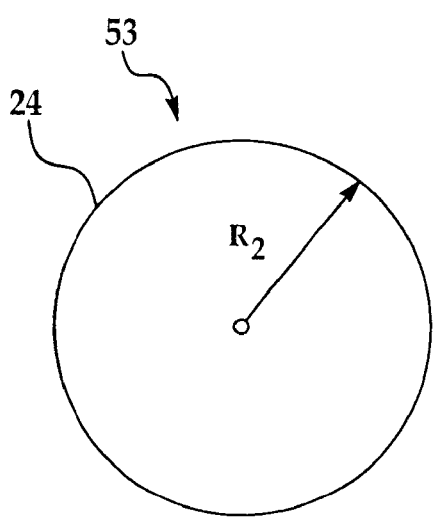
FIG. 5a is a sectional view taken along the line 5a-5a in FIG. 5.
Figure 5B:
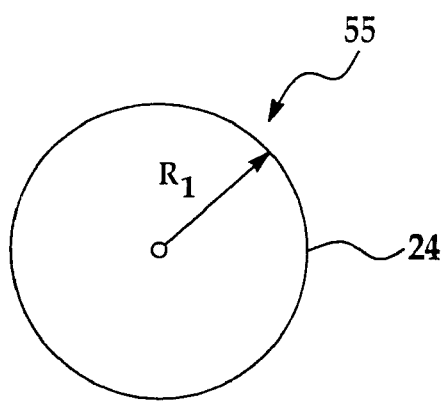
FIG. 5b is a sectional view taken along the line 5b-5b in FIG. 5.

The method and apparatus of the disclosed embodiments may be employed to layup (place) plies 24 onto tapered conical or compound curved substrate surfaces 54. For example, as shown in FIG. 5, a portion of the aircraft fuselage 50 may be mounted on pinions 52 for indexed rotation to allow layup of plies 24 that form the skin of the fuselage 50. An automated or semi-automated ply layup machine (not shown) may employ the ply placement device 20 to place plies 24 along the length of the fuselage 50. The fuselage 50 includes a barrel section 53 having a substantially constant radius $R_2$, and a tapered section 55, having a radius $R_1$ that varies along the length of the tapered section 55. The device 20 may be used to place tapered plies 24 along the compound surfaces 54 of the fuselage 50 by varying the width of the ply 24 to create gores and by continuously varying the shape of the guide surface 30 and guide edge 32 to match the changing contour of the fuselage surface 54.

The method and apparatus of the disclosed embodiments may be employed to layup (place) plies 24 onto cylindrical, tapered conical or compound curved substrate surfaces at any angle to the axis of the substrate 26. For example, and without limitation, the device 20 may be oriented to travel at 45° or any other helical angle on a cylindrical substrate. The inclination angle Φ of the ply guide 22 may be continuously varied, as required, to match the changing shape of tapered conical or compound curved substrate surfaces 28. For example, a tapered ply course 57 extending in a cross pattern partially around the fuselage 50 would have a radius that varies along its length and may be placed using the method and apparatus of the disclosed embodiments. The equations described previously for calculating the device edge curvature 32 and guide surface 30 may still apply since the helical path merely changes the radius R of the substrate surface 28 (FIG. 3).

Figure 6A:
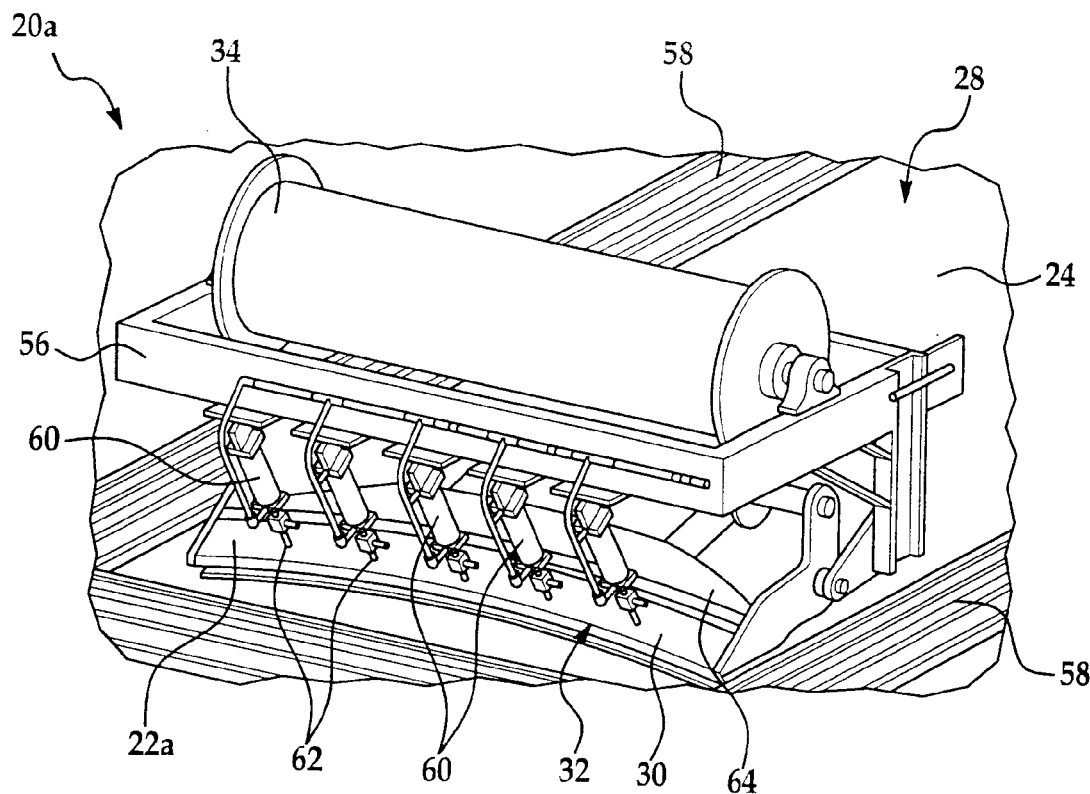
FIG. 6a is a perspective view of an alternate embodiment of the apparatus having a flexible ply guide.
Figure 7:
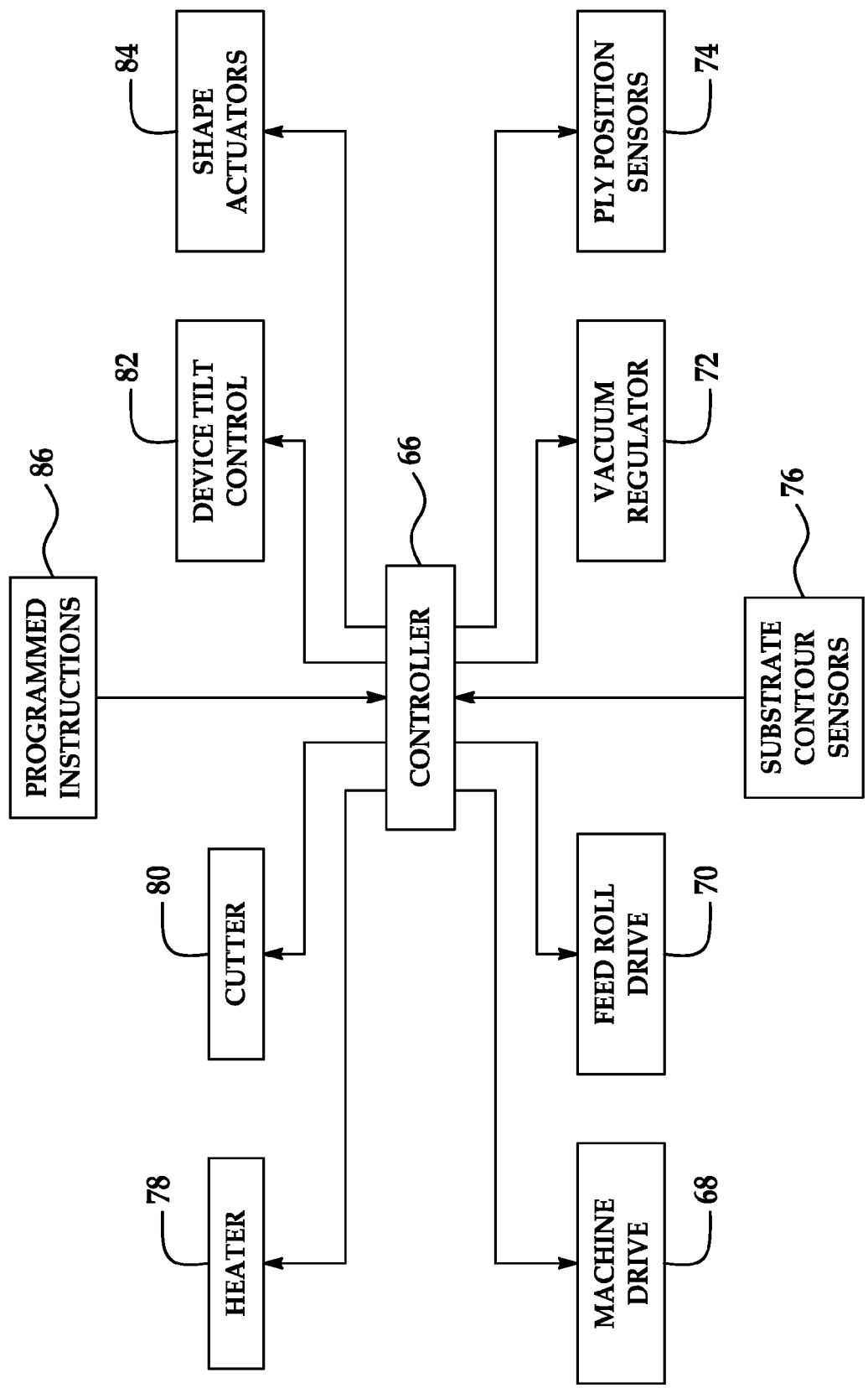
FIG. 7 is an overall block diagram illustrating functional components of the apparatus.

The shape of the guide surface 30 and guide edge 32 may be varied to match the contour of the fuselage 50 by using an alternate embodiment 20*a* of the ply placement device shown in FIG. 6*a*. A flexible ply guide 22*a* along with a substrate seal (not shown) and a vacuum manifold 64 are mounted on a moveable frame 56, along with a ply supply roll 34. The frame 56 is mounted for movement along guide rails 58 over the substrate surface 24. The flexible ply guide 22*a* may be manufactured from any of various flexible, elastic materials which return to their original shape after being deformed. A plurality of transversally spaced motor members which may comprise actuators 60 are mounted on the frame 56, and provide a means for changing the shape (curvature) of the guide surface 30 and the guide edge 32. Each of the actuators 60 include a pressure foot 62 that bears against a portion of the ply guide 22*a*. The actuators 60 may be pneumatically, hydraulically or electrically driven, and are individually controlled by a later discussed controller 66 (FIG. 7). The actuators 60 individually deform portions of the flexible ply guide 22*a* so that the shape of the guide surface 30 and guide edge 32 are altered by the actuators 60 to specifically match the radius of the substrate surface 28. In some cases, the radius of the substrate surface 28, and the variation of this radius may be known and used by the controller 66 to operate the actuator 60. However, it may also be possible to use surface contour sensors 76 (FIG. 7) which are mounted on frame 56 and function to continuously sense the contour, and thus the radius of the substrate surface 28. This sensed contour information may then be used by the controller 66 to reconfigure the shape of the ply guide 22*a* using the actuators 60.

Figure 6B:
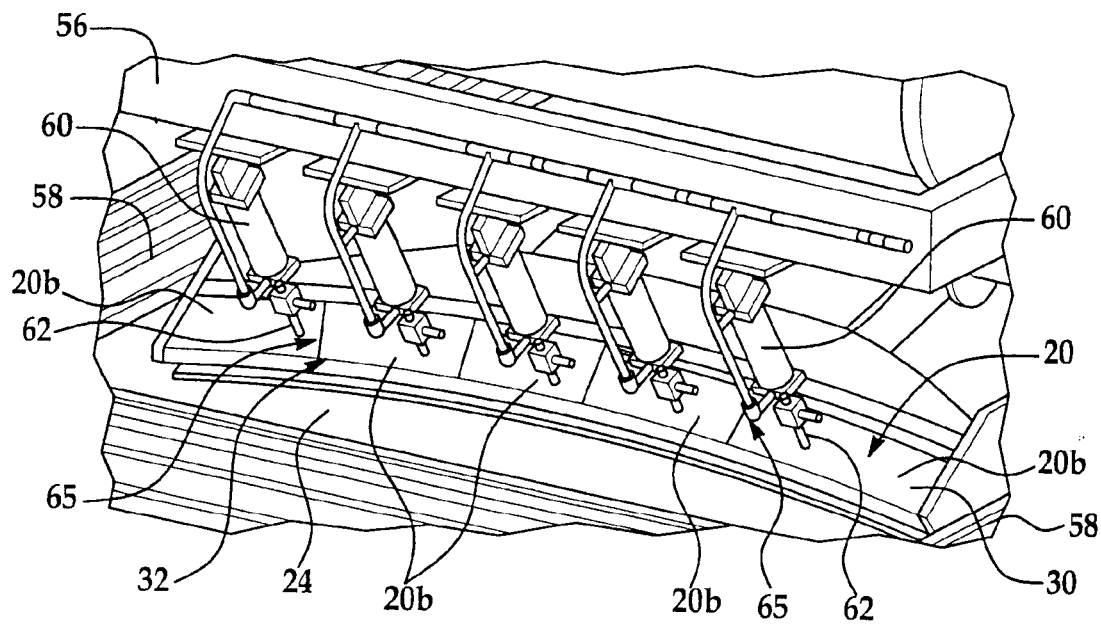
FIG. 6b is a view similar to FIG. 6a but showing the use of a segmented ply guide.

FIG. 6*b* illustrates an alternate form of the ply guide 22 which is formed by individual, separately movable segments 20*b*. The guide segments 20*b* may substantially rigid members that overlap each other and are respectively displaced by actuators 60 in order to form the desired shape of the guide surface 30 and guide edge 32.

Attention is now directed to FIG. 7 which illustrates a control system for operating the ply placement device 20 described above. A controller 66 which may comprise a programmed computer or a programmable logic controller (PLC), controls various functions of the device 20 based on a set of programmed instructions 86 which may be stored software, for example. The controller 66 may also receive other information that is used to control the device 20, including ply position sensors 74 that sense the position (edges) of plies 24 on the substrate surface 28 which provides information to adjust the position of vacuum edge seals to match the width W of the ply 24, and substrate contour sensors 76 which sense the contour (radius) of the substrate 28 as the device 20 moves over the substrate 24.

The controller 66 may control a machine drive 68 which drives the device 20 over the substrate 26. For example, the machine drive 68 may drive the frame 56 along the guide rails 58, as shown in FIG. 6*a*. The controller 66 may control a feed roll drive 70 that controls the feed roll 34 in order to dispense the ply material to the device 20 at a desired rate. An additional roller (not shown) may be provided to take up backing film or paper (not shown) that may be commonly applied to tacky ply materials to prevent self-adhesion. The backing film or paper may need to be removed from the ply 24 just prior to the ply 24 being placed on the substrate 26. A vacuum regulator 72 may also be controlled by the controller 66 in order to regulate the amount of vacuum suction that is used to draw the ply 24 down onto the substrate surface 28. The controller 66 may control the temperature of a heater 78 used to heat the ply 24, as well as a cutter 80 that is used to trim selvage from the ply 24 edges, to a cut a tapered width to the ply 24, or to cut each ply 24 at the end of a ply course. A device tilt control 82 used to change the angle of inclination of the ply guide 22 may be operated by the controller 66 based either on stored substrate contour data, or dynamic contour data generated by the contour sensors 76. Finally, the controller 66 may control the actuators 84 which function to configure the shape of the guide surface 30 and guide edge 32.

Figure 8:
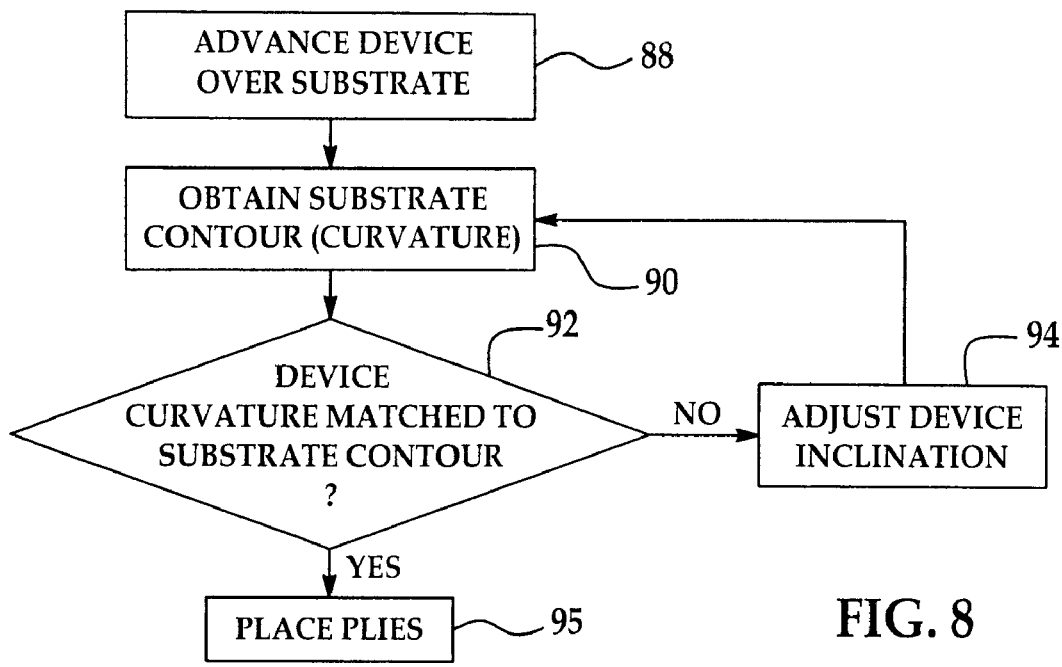
FIG. 8 is a flow diagram illustrating the steps of a method for placing plies on a curved substrate.

Attention is now directed to FIG. 8 which depicts the basic steps for placing plies 24 on a substrate surface 28 using the apparatus previously described with a rigid ply guide 22. Starting at step 88, the ply placement device 20 is advanced over the substrate 24, and the contour of the substrate surface 28 is obtained at step 90, either by dynamically sensing the contour of the substrate 28, or by retrieving stored data that represents the contour. At step 92, a determination is made of whether the shape of the guide surface 30 and guide edge 32 match the substrate contour. If a sufficiently close match is not determined to exist, then the inclination of the ply guide 22 is adjusted at step 94, following which steps 90 and 92 are repeated. If the device curvature is found to match the substrate contour at step 90, then the process proceeds with the placement of plies at step 95.

Figure 8A:
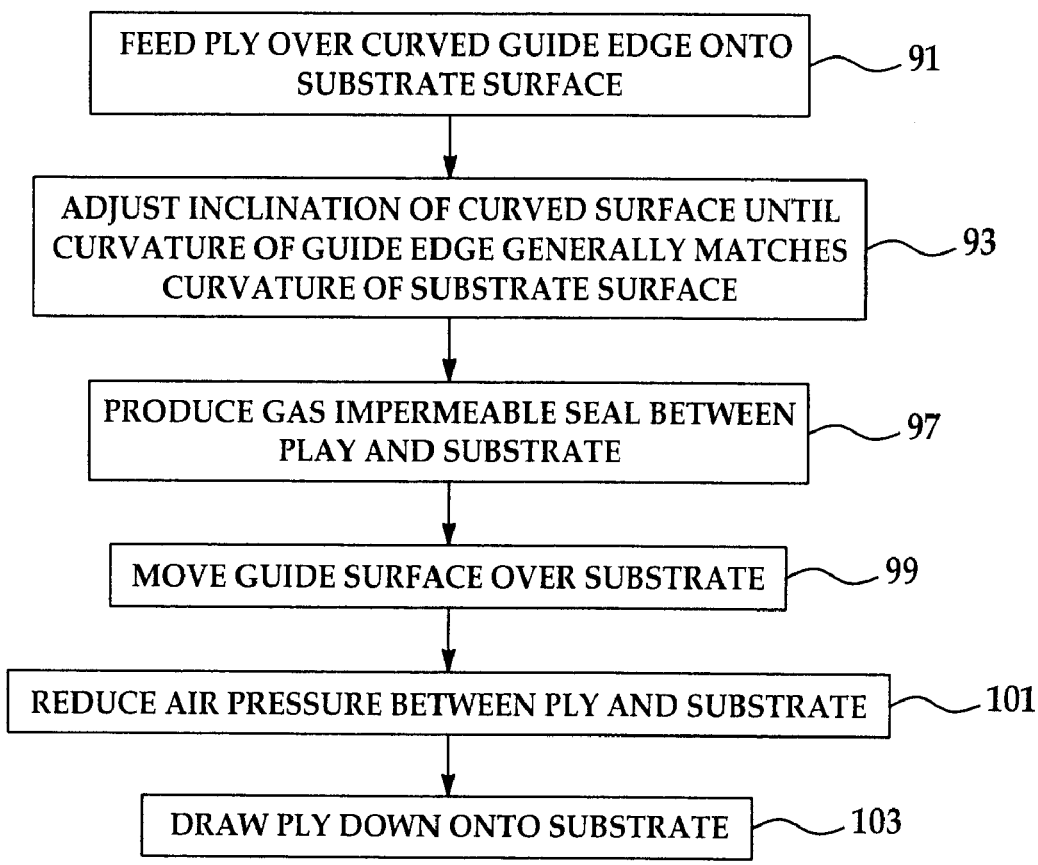
FIG. 8a is a flow diagram illustrating the steps of a method for placing plies on a curved substrate forming an alternate embodiment.

FIG. 8*a* illustrates an alternate method embodiment. Beginning at step 91, the ply 24 is fed over the curved guide edge 32 of a guide surface 30 onto the substrate surface 28. At step 93, the inclination of the guide surface 30 is adjusted so that the curvature of the curved guide edge 32 generally matches the curvature of the substrate surface 28. A gas impermeable seal 33, 41 is created between the ply 24 and the substrate surface 28 at step 97. The guide surface 30 is then moved over the substrate surface 28, as shown at step 99. At step 101, the air pressure between the ply 24 and the substrate surface 28 is reduced. The reduction of air pressure at step 99 allows the ply 24 to be drawn down onto the substrate surface 28, as shown at step 103.

Figure 9:
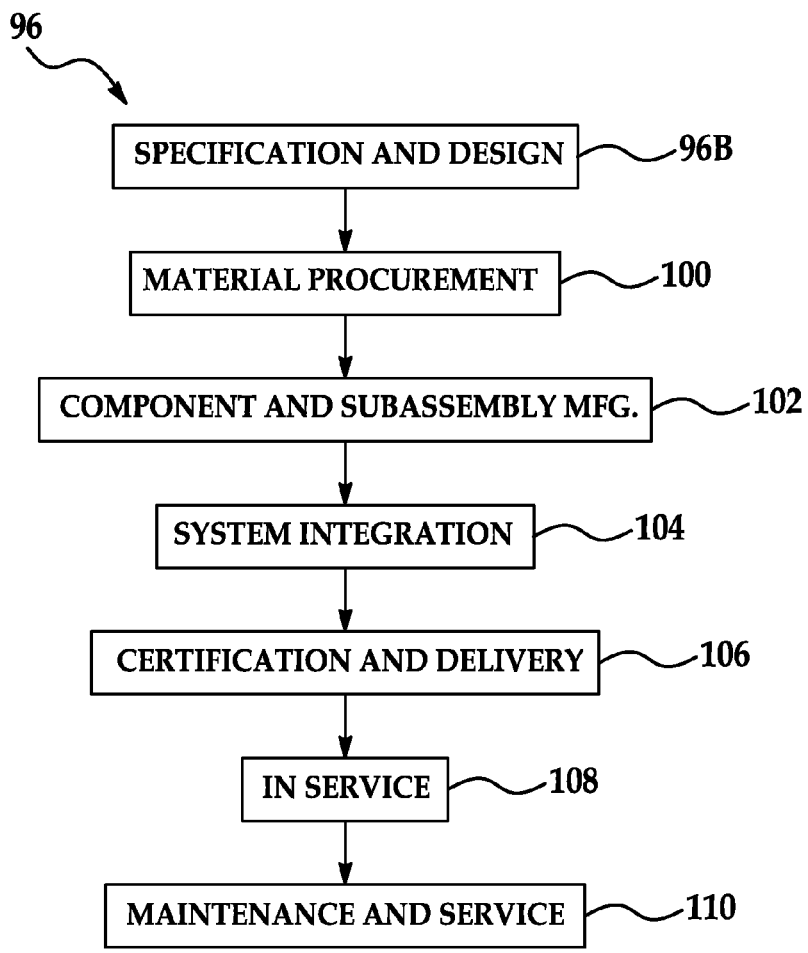
FIG. 9 is a flow diagram of aircraft production and surface methodology.
Figure 10:
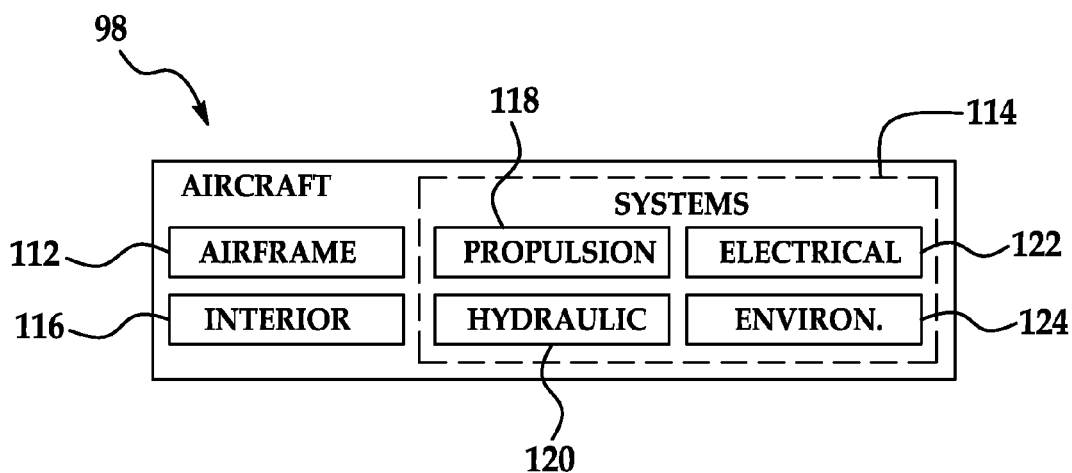
FIG. 10 is a block diagram of an aircraft.

Embodiments of the disclosure may find use in a variety of potential applications, particularly in the transportation industry, including for example, aerospace and automotive applications. Thus, referring now to FIGS. 9 and 10, embodiments of the disclosure may be used in the context of an aircraft manufacturing and service method 96 as shown in FIG. 9 and an aircraft 98 as shown in FIG. 10. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 96 may include specification and design 96B of the aircraft 98 and material procurement 100. During production, component and subassembly manufacturing 102 and system integration 104 of the aircraft 98 takes place. Thereafter, the aircraft 98 may go through certification and delivery 106 in order to be placed in service 108. While in service by a customer, the aircraft 98 is scheduled for routine maintenance and service 110 (which may also include modification, reconfiguration, refurbishment, and so on).

Each of the processes of method 96 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 98 produced by exemplary method 96 may include an airframe 112 with a plurality of systems 114 and an interior 116. Examples of high-level systems 114 include one or more of a propulsion system 118, an electrical system 122, a hydraulic system 120, and an environmental system 124. Any number of other systems may be included. Although an aerospace example is shown, the principles of the disclosure may be applied to other industries, such as the automotive industry.

Apparatus and methods embodied herein may be employed during any one or more of the stages of the production and service method 96. For example, components or subassemblies corresponding to production process 102 may be fabricated or manufactured in a manner similar to components or subassemblies produced while the aircraft 98 is in service. Also, one or more apparatus embodiments, method embodiments, or a combination thereof may be utilized during the production stages 102 and 104, for example, by substantially expediting assembly of or reducing the cost of an aircraft 98. Similarly, one or more of apparatus embodiments, method embodiments, or a combination thereof may be utilized while the aircraft 98 is in service, for example and without limitation, to maintenance and service 110.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of placing a ply on a curved substrate, comprising the steps of:
    feeding the ply over a curved guide edge of a guide surface onto the substrate, said curved guide edge forming a substantially gas impermeable seal with an underside of said ply;
    adjusting the inclination of the guide surface until the curvature of the curved guide edge generally matches the curvature of the curved substrate, said curvature of the curved guide edge extending laterally with respect to said ply; and,
    drawing the ply down onto the curved substrate by reducing the air pressure between the ply and the curved substrate.

2. The method of claim 1, further comprising the step of:
    producing a substantially gas impermeable seal between the curved substrate and the ply.

3. The method of claim 1, further comprising the step of:
    moving the guide surface over the curved substrate as the ply is fed over the curved guide edge.

4. The method of claim 1, wherein said ply comprises a composite layup of plies placed on said curved substrate.

5. A method of placing a ply on a curved substrate, comprising the steps of:
    (A) moving a ply guide over the curved substrate;
    (B) adjusting the curvature of a curved guide edge on the ply guide to generally conform to the curvature of the substrate;
    (C) feeding the ply over the curved guide edge onto the curved substrate, said curved guide edge forming a substantially gas impermeable seal with an underside of said ply, said curvature of the curved guide edge extending laterally with respect to said ply; and,
    drawing the ply down onto the curved substrate by reducing the air pressure between the ply and the curved substrate.

6. The method of claim 5, wherein step (B) includes altering the inclination of the curved guide edge relative to the curved substrate.

7. The method of claim 5, wherein step (B) includes displacing individual portions of the curved guide edge.

8. The method of claim 5, wherein step (B) includes deforming at least portions of the curved guide edge.

9. A method of placing a ply on a curved substrate, comprising the steps of:
    (A) relatively moving a ply placement device and a curved substrate;
    (B) forming a gas impermeable seal between the ply placement device and the curved substrate;
    (C) forming a gas impermeable seal between the ply placement device and the ply;
    (D) guiding the ply over a curved guide surface on the ply placement device;
    (E) guiding the ply from the curved guide surface down over a curved guide edge onto the curved substrate, said curved guide edge forming a substantially gas impermeable seal with an underside of said ply;
    (F) using reduced air pressure to draw the ply down onto the curved substrate;
    (G) determining the curvature of the curved substrate; and,
    (H) changing the curvature of the curved guide edge based on the substrate curvature determined in step (G).

* * * * *